United States Patent
Zeng

(10) Patent No.: US 10,645,271 B2
(45) Date of Patent: May 5, 2020

(54) METHOD AND APPARATUS FOR GENERATING BLURRED IMAGE BASED ON BLURRING DEGREE, AND MOBILE TERMINAL

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/070,531

(22) PCT Filed: Apr. 1, 2017

(86) PCT No.: PCT/CN2017/079380
§ 371 (c)(1),
(2) Date: Jul. 17, 2018

(87) PCT Pub. No.: WO2017/206589
PCT Pub. Date: Dec. 7, 2017

(65) Prior Publication Data
US 2019/0028630 A1 Jan. 24, 2019

(30) Foreign Application Priority Data
Jun. 2, 2016 (CN) .......................... 2016 1 0394282

(51) Int. Cl.
*H04N 5/228* (2006.01)
*H04N 5/232* (2006.01)
(Continued)

(52) U.S. Cl.
CPC ........... *H04N 5/23212* (2013.01); *G06T 1/20* (2013.01); *H04N 5/2226* (2013.01);
(Continued)

(58) Field of Classification Search
CPC .. H04N 5/23212; H04N 5/2226; H04N 5/232; H04N 13/239; G06T 1/20
(Continued)

(56) References Cited

U.S. PATENT DOCUMENTS

| 8,619,148 B1 | 12/2013 | Watts et al. |
| 9,076,267 B2 | 7/2015 | Shimizu |

(Continued)

FOREIGN PATENT DOCUMENTS

| CN | 101764925 | 6/2010 |
| CN | 103152521 | 6/2013 |

(Continued)

OTHER PUBLICATIONS

USPTO, Office Action for U.S. Appl. No. 16/237,833, dated Mar. 21, 2019.
(Continued)

*Primary Examiner* — Usman A Khan
(74) *Attorney, Agent, or Firm* — Hodgson Russ LLP

(57) ABSTRACT

A method and a device for generating a blurred image, and a mobile terminal are provided. The method includes the followings. According to preview image data acquired via two rear cameras of a dual-camera device, first depth-of-field information for a foreground region and second depth-of-field information for a background region in a current preview image are determined. In addition, a basic value of a blurring degree is acquired according to the first depth-of-field information and the second depth-of-field information. Furthermore, Gaussian blur process is performed on the background region according to the basic value of the blurring degree to generate the blurred image.

17 Claims, 3 Drawing Sheets

(51) Int. Cl.
| | |
|---|---|
| *H04N 13/239* | (2018.01) |
| *H04N 5/225* | (2006.01) |
| *H04N 5/262* | (2006.01) |
| *G06T 1/20* | (2006.01) |
| *H04N 5/222* | (2006.01) |
| *H04N 5/272* | (2006.01) |
| *H04N 13/00* | (2018.01) |

(52) U.S. Cl.
CPC .......... *H04N 5/2258* (2013.01); *H04N 5/232* (2013.01); *H04N 5/23229* (2013.01); *H04N 5/2621* (2013.01); *H04N 5/272* (2013.01); *H04N 13/239* (2018.05); *H04N 2013/0088* (2013.01)

(58) Field of Classification Search
USPC ..................................................... 348/222.1
See application file for complete search history.

(56) References Cited

U.S. PATENT DOCUMENTS

| | | | |
|---|---|---|---|
| 9,185,387 | B2 | 11/2015 | Campbell et al. |
| 9,311,901 | B2 | 4/2016 | Webster et al. |
| 9,569,854 | B2 | 2/2017 | Wu et al. |
| 10,015,469 | B2 | 7/2018 | Campbell et al. |
| 10,217,195 | B1 | 2/2019 | Agrawal et al. |
| 2002/0140823 | A1 | 10/2002 | Sakurai et al. |
| 2006/0268101 | A1* | 11/2006 | He .................. H04N 7/147 348/14.12 |
| 2013/0147843 | A1 | 6/2013 | Shimizu |
| 2013/0169760 | A1* | 7/2013 | Watts ................. G06K 9/40 348/47 |
| 2014/0009585 | A1 | 1/2014 | Campbell et al. |
| 2015/0002545 | A1 | 1/2015 | Webster et al. |
| 2015/0334348 | A1 | 11/2015 | Cutler et al. |
| 2016/0029004 | A1 | 1/2016 | Campbell et al. |
| 2016/0063715 | A1 | 3/2016 | Wan |
| 2016/0328853 | A1 | 11/2016 | Wu et al. |
| 2018/0227478 | A1* | 8/2018 | Li .................. H04N 5/23212 |

FOREIGN PATENT DOCUMENTS

| | | |
|---|---|---|
| CN | 103945118 | 7/2014 |
| CN | 104063858 | 9/2014 |
| CN | 104463775 | 3/2015 |
| CN | 105100615 | 11/2015 |
| CN | 105163042 | 12/2015 |
| CN | 106060423 | 10/2016 |
| EP | 2683169 | 1/2014 |

OTHER PUBLICATIONS

EPO, Office Action for EP Application No. 17805534, dated Feb. 4, 2019.

SIPO, First Office Action for CN Application No. 201710813593, dated Apr. 28, 2019.

USPTO, Notice of Allowance for U.S. Appl. No. 16/237,833, dated Jun. 17, 2019.

WIPO, ISR for International Application No. PCT/CN2017/079380, dated May 24, 2017.

SIPO, First Office Action for CN Application No. 201610394282, dated Jun. 5, 2017.

\* cited by examiner

METHOD AND APPARATUS FOR GENERATING BLURRED IMAGE BASED ON BLURRING DEGREE, AND MOBILE TERMINAL

CROSS REFERENCE TO RELATED APPLICATION

This application is a U.S. national phase application of International Application No. PCT/CN2017/079380, filed on Apr. 1, 2017, which claims a priority to Chinese Patent Application Serial No. 201610394282.7, filed with the State Intellectual Property Office of P. R. China on Jun. 2, 2016, by GUANGDONG OPPO MOBILE TELECOMMUNICATIONS CORP., LTD., and titled with "Method and Device for Generating Blurred Image and Mobile Terminal".

FIELD

The present disclosure relates to a field of image processing technologies, and more particularly to a method and a device for generating a blurred image, and a mobile terminal.

BACKGROUND

With continuous development of mobile terminal technologies, photograph functions in the mobile terminal have become richer and richer. At present, a user can choose to generate a background blurred photo during a photographing process.

SUMMARY

Embodiments of present disclosure provide a method for generating a blurred image. The method includes: determining, according to preview image data acquired via two rear cameras of a dual-camera device, first depth-of-field information for a foreground region and second depth-of-field information for a background region in a current preview image; acquiring a basic value of a blurring degree according to the first depth-of-field information and the second depth-of-field information; and performing Gaussian blur process on the background region according to the basic value of the blurring degree to generate the blurred image.

Embodiments of the present disclosure provide a mobile terminal. The mobile terminal includes a housing, a processor, a memory, a circuit board, and a power supply circuit, in which the circuit board is enclosed by the housing; the processor and the memory are positioned on the circuit board; the power supply circuit is configured to provide power for respective circuits or components of the electronic device; the memory is configured to store executable program codes; and the processor is configured to run a program corresponding to the executable program codes by reading the executable program codes stored in the memory, to perform following operations: determining, according to preview image data acquired via two rear cameras of a dual-camera device, first depth-of-field information for a foreground region and second depth-of-field information for a background region in a current preview image; acquiring a basic value of a blurring degree according to the first depth-of-field information and the second depth-of-field information; and performing Gaussian blur process on the background region according to the basic value of the blurring degree to generate the blurred image.

Embodiments of the present disclosure provide a non-transitory computer readable medium. The non-transitory computer readable medium has computer programs stored thereon. When the computer programs are executed by a processor, the method for generating the blurred image described above is realized.

BRIEF DESCRIPTION OF THE DRAWINGS

The above or additional aspects and advantages of the present disclosure will become apparent and more readily appreciated from the following descriptions made with reference to the drawings, in which.

DETAILED DESCRIPTION

Figure 1:
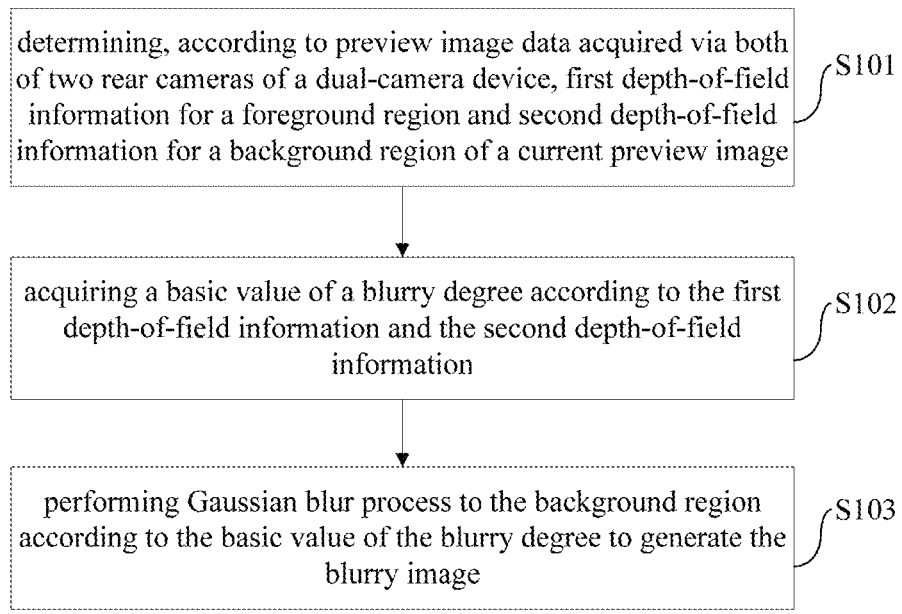
FIG. 1 is a flow chart illustrating a method for generating a blurred image according to an embodiment of the present disclosure.

Reference will now be made in detail to embodiments of the present disclosure, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In related arts, when a user chooses to generate a background blurred photo during a photographing process, it requires the user to select a foreground region in a preview image and set a blurring degree in advance. The user needs a certain amount of learning costs for the photographing process, and the photographing process is trivial and inefficient.

The present disclosure relates to a method for generating a blurred image and a mobile terminal. The method includes the followings. According to preview image data acquired via two rear cameras of a dual-camera device, first depth-of-field information for a foreground region and second depth-of-field information for a background region in a current preview image are determined. In addition, a basic value of a blurring degree is acquired according to the first depth-of-field information and the second depth-of-field information. Furthermore, Gaussian blur process is performed on the background region according to the basic value of the blurring degree to generate the blurred image.

The present disclosure relates to a device for generating a blurred image. The device includes the followings. The device includes a determining module, an acquiring module and a generating module. The acquiring module is configured to determine, according to preview image data acquired via two rear cameras of a dual-camera device, first depth-of-field information for a foreground region and second depth-of-field information for a background region in a current preview image. The acquiring module is configured to acquire a basic value of a blurring degree according to the first depth-of-field information and the second depth-of-field information. The generating module is configured to perform Gaussian blur process on the background region according to the basic value of the blurring degree to generate the blurred image.

The present disclosure relates to a terminal device. The terminal device includes the device for generating a blurred image described above.

The present disclosure relates to another terminal device. The terminal device includes a housing, a processor, a memory, a circuit board and a power supply circuit. The circuit board is enclosed by the housing. The processor and the memory are positioned on the circuit board. The power supply circuit is configured to provide power for respective circuits or components of the electronic device. The memory is configured to store executable program codes; and the processor is configured to run a program corresponding to the executable program codes by reading the executable program codes stored in the memory, to perform the method for generating a blurred image described above.

The present disclosure relates to a non-transitory computer readable medium. The non-transitory computer readable medium has computer programs stored thereon. When the computer programs are executed by a processor, the method for generating the blurred image described above is realized.

A method and a device for generating a blurred image and a mobile terminal according to embodiments of the present disclosure will be described with reference to drawings.

FIG. 1 is a flow chart illustrating a method for generating a blurred image according to an embodiment of the present disclosure.

As illustrated in FIG. 1, the method for generating a blurred image according to an embodiment of the present disclosure includes the followings.

In block S101, first depth-of-field information for a foreground region and second depth-of-field information for a background region in a current preview image are determined according to preview image data acquired by two rear cameras of a dual-camera device.

In an embodiment of the present disclosure, the dual-camera device has two rear cameras. A manner for arranging the two rear cameras may include, but be not limited to, the followings.

In an embodiment, the two rear cameras are arranged along a horizontal direction.

In an embodiment, the two rear cameras are arranged along a longitudinal direction.

The horizontal direction refers to a direction parallel to a short side of a mobile terminal, while the longitudinal direction is a direction parallel to a long side of the mobile terminal.

It is to be illustrated that, the two rear cameras may be arranged according to other manners. For example, the two rear cameras may be arranged such that a line connecting the two rear cameras and a horizontal direction form a predetermined angle.

In embodiments of the present disclosure, the preview image data may be data obtained by imaging a photographed object via a camera. The current preview image is generated based on at least one of preview image data obtained via the two rear cameras. The depth-of-field information refers to a distance from a closest point where a clear image of a photographed object is generated to a farthest point where a clear image a photographed object is generated, i.e., a special depth within which a clear image of the photographed object is generated. The depth-of-field information corresponding to each image point of the preview image may be searched based on a phase difference contained in the preview image data obtained via the two rear cameras according to a respective image point.

Since positions where the two rear cameras are located are different, there may be a certain angular difference and a certain distance different for the two rear cameras, in view of the photographed object. Therefore, there is a certain phase difference in corresponding preview image data. For example, regarding to a point A on the photographed object, a pixel coordinate of the point A is (30, 50) in the preview image data of the camera 1, while the pixel coordinate of the point A is (30, 48) in the preview image data of camera 2. Therefore, the phase difference of the pixel point corresponding to the point A is 50−48=2 in the preview image data of the camera 1 and of the camera 2.

In embodiments of the present disclosure, a relationship between the depth-of-field information and the phase differences may be established in advance according to experimental data and camera parameters. Therefore, corresponding depth-of-field information may be searched based on the phase difference in the preview image data obtained via the two cameras for each image point of the preview image. For example, when the phase different is 2 for the above point A, if the depth-of-field is 5 meters as searched according to a predetermined correspondence relationship, the depth-of-field information corresponding to the point A in the current preview image is 5 meters. In this way, the depth-of-field information of each image point in the current preview image may be obtained.

After the depth-of-field information of each image point in the current preview image is obtained, the first depth-of-field information for the foreground region in the current preview image may be further determined. The depth-of-field information for a region excluding the foreground region having the first depth-of-field information is determined as the second depth-of-field information for the background region.

In embodiments, the first depth-of-field information may be determined via various manners. For example, determination of the first depth-of-field information for the foreground region in the current preview image may be exemplary illustrated via the followings.

In an embodiment, the foreground region in the current preview image is determined, and the first depth-of-field information for the foreground region is consisted of depth-of-field information of pixel points located in the foreground region.

The first depth-of-field information for the foreground region is consisted of the depth-of-field information of each pixel point located in the foreground region.

The foreground region may be selected by a user, or may be determined according to an in-focused region selected by the user or selected by default. For example, the foreground region may be obtained by extending the in-focused region by a predetermined region.

Figure 2:
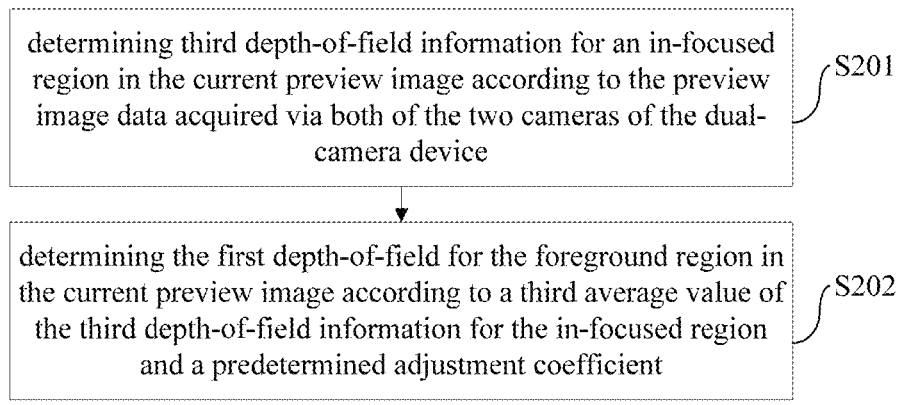
FIG. 2 is a flow chart illustrating a method for generating a blurred image according to another embodiment of the present disclosure.

In an embodiment, the first depth-of-field information for the foreground region is determined according to the depth-of-field information of the in-focused region in the current preview image. In detail, the following blocks S201-S202 illustrated in FIG. 2 are included.

In block S201, third depth-of-field information for the in-focused region in the current preview image is determined according to the preview image data acquired via the two rear cameras in the dual-camera device.

The third depth-of-field information for the in-focused region is consisted of the depth-of-field information of each pixel point located in the in-focused region. Therefore, the depth-of-field information of each pixel point may be searched according to the phase difference of each pixel point in the preview image data acquired by the two rear cameras in the dual-camera device. Thus, the third depth-of-field information for the in-focused region in the current preview image is determined by determining the depth-of-field information of each pixel point located in the in-focused region in the current preview image.

In embodiments of the present disclosure, the in-focused region may be selected by the user or may be automatically adjusted by the camera.

In block S202, the first depth-of-field information for the foreground region in the current preview image is determined according to a third average value of the third depth-of-field for the in-focused region and a predetermined adjustment value.

The depth-of-field information of a region excluding the foreground region having the first depth-of-field information is determined as the second depth-of-field information for the background region.

In an embodiment of the present disclosure, the third average value may be adjusted according to the predetermined adjustment value, to obtain the first depth-of-field information for the foreground region in the current preview image. A manner for adjusting the third average value may include, but be not limited to, followings.

In an embodiment, the predetermined adjustment value may be added to the third average value to obtain an upper limit of a depth-of-field range. The predetermined adjustment value may be subtracted from the third average value to obtain a lower limit of a depth-of-field range. The depth-of-field information between the upper limit of the depth-of-field range and the lower limit of the depth-of-field range is the first depth-of-field information for the foreground region in the current preview image.

In an embodiment, the third average value is multiplied with the predetermined adjustment value to obtain the upper limit of the depth-of-field range. The third average value is divided by the predetermined adjustment value to obtain the lower limit of the depth-of-field range. The depth-of-field information between the upper limit of the depth-of-field range and the lower limit of the depth-of-field range is the first depth-of-field information for the foreground region in the current preview image.

In block S102, a basic value of blurry degree is obtained according to the first depth-to-field information and the second depth-of-field information.

The basic value of the blurry degree is a basic value of the blurring degree. A blurring coefficient may be obtained by performing a calculation on the basis of the basic value of the blurring degree. The background region may be blurred according to the blurring coefficient.

In an embodiment of the present disclosure, the basic value of the blurring degree may be acquired in many ways according to the first depth-of-field information and the second depth-of-field information. For example, a representative value of the first depth-of-field information and a representative value of the second depth-of-field information may be obtained respectively. The basic value of the blurring degree is determined by performing a calculation on the representative value of the first depth-of-field information and the representative value of the second depth-of-field information. The representative value may include, but be not limited to, an average value, a sampled value or the like.

The calculation employed to obtain the basic value of the blurring degree may include, but be not limited to, a ratio, a difference, or multiplying or adding a predetermined value on the ratio or the difference.

In an embodiment of the present disclosure, the block S102 may include the followings. A first average value of the first depth-of-field information and a second average value of the second depth-of-field information are acquired. A ratio of the first average value and the second average value is calculated to obtain the basic value of the blurring degree. The higher the ratio of the first average value and the second average value, the higher the basic value of the blurring degree.

In block S103, the blurred image is generated by performing Gaussian blur process on the background region based on the basic value of the blurring degree.

In embodiments of the present disclosure, the Gaussian blur process may be performed on the background region according to the basic value of the blurring degree and the depth-of-field information for the background region (i.e., the second depth-of-field information), such that the higher the depth-of-field information for the background region, the higher the blurring degree of the background region. In detail, a unified blurring coefficient may be determined for all pixel points in the background region according to the basic value of the blurry region and the second depth-of-field information. Alternatively, a corresponding blurring coefficient is determined for each pixel point in the background region and the Gaussian blur process is performed on each pixel point in the background region based on the blurring coefficient.

In an embodiment of the present disclosure, the block S103 may include the followings. A blurring coefficient is determined for each pixel in the background region according to the basic value of the blurring degree and the second depth-of-field information. The blurred image is generated by performing the Gaussian blur process on the background region based on the blurring coefficient of each pixel in the background region.

The blurring coefficient represents a degree of blurring the background region. The higher the blurring coefficient, the higher the degree of blurring the background region.

In an embodiment of the present disclosure, a multiplied value is calculated by multiplying the basic value of the blurry value by the second depth-of-field information for each pixel of the background region, to obtain the blurring coefficient for each pixel in the background region.

With the method for generating a blurred image according to embodiments of the present disclosure, the depth-of-field information for the foreground region and for the background region in the current preview image are acquired according to the preview image data obtained via the two rear cameras in the dual-camera device, the basic value of the blurring degree is acquired according to the depth-of-field information for the foreground region and for the background region, and the background region is processed with the Gaussian blur process according to the basic value of the blurring degree to generate the blurred image. The process of generating the background blurred image is simplified when photographing, without selections of the foreground region and the blurring coefficient at each time when photographing. That is, the background blurred image may be generated, the photographing efficiency may be increased and the photographing experience may be improved.

Figure 3:
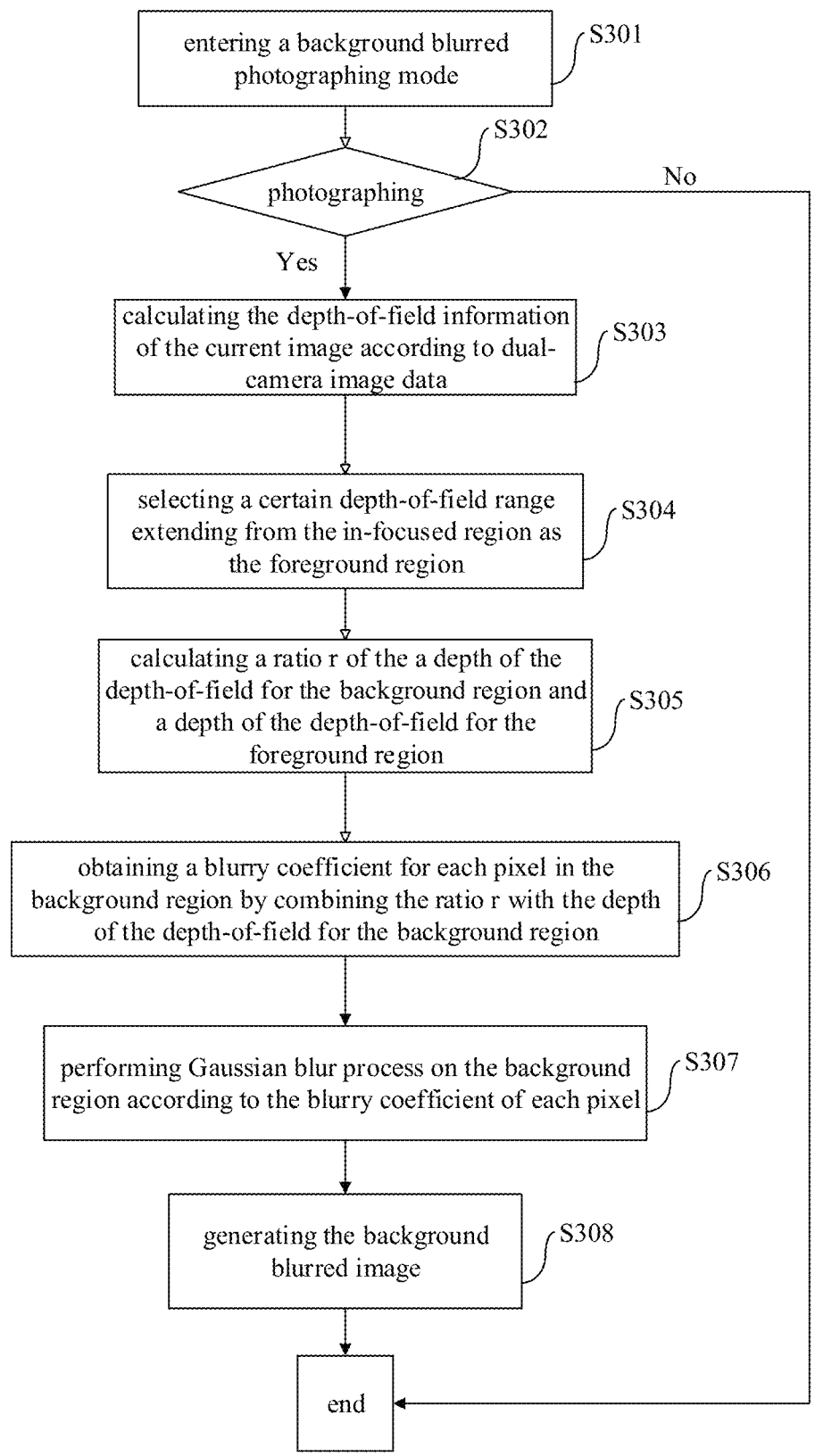
FIG. 3 is a flow chart illustrating a method for generating a blurred image according to another embodiment of the present disclosure.

FIG. 3 is a flow chart illustrating a method for generating a blurred image according to another embodiment of the present disclosure.

As illustrated in FIG. 3, the method for generating a blurred image according to embodiments of the present disclosure includes the followings.

In block S301, a background blurred photographing mode is entered.

In block S302, it is determined whether to photograph. If yes, a block S303 is executed, otherwise the method ends.

In block S303, the depth-of-field information of the current image is calculated according to dual-camera image data.

In block S304, a certain depth-of-field range extending from the in-focused region is selected as the foreground region, In block S305, a ratio r of a depth of the depth-of-field for the background region and a depth of the depth-of-field for the foreground region is calculated.

The depth of the depth-of-field is the depth-of-field information.

In block S306, a blurring coefficient for each pixel in the background region is obtained by combining the ratio r with the depth of the depth-of-field for the background region.

In block S307, Gaussian blur process is performed on the background region according to the blurring coefficient of each pixel.

In block S308, the background blurred image is generated.

Then, the method ends.

Therefore, the region within a certain depth-of-field range extending from the in-focused region is automatically set as the foreground region, and other regions are determined as the background region. According to the ratio of the depth-of-field information for the foreground region and for the background region, and in connection with depth-of-field automatic detection blur coefficient of the background region, there is no need by the user to select the foreground region and the blurring coefficient, user's operations are simplified and photographing efficiency is improved.

In order to achieve above embodiments, embodiments of the present disclosure further provide a method for generating a blurred image.

Figure 4:
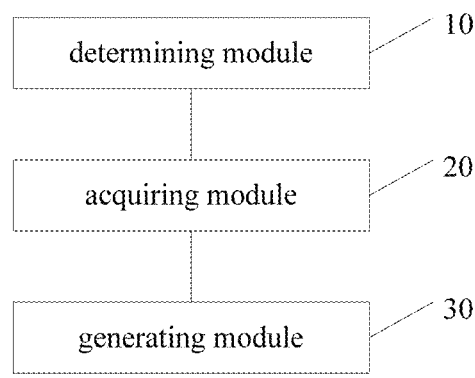
FIG. 4 is a schematic diagram illustrating a device for generating a blurred image according to an embodiment of the present disclosure.

FIG. 4 is a schematic diagram illustrating a device for generating a blurred image according to an embodiment of the present disclosure.

As illustrated in FIG. 4, the method for generating a blurred image according to embodiments of the present disclosure includes a determining module 10.

In detail, the determining module 10 is configured to determine, according to preview image data acquired via two rear cameras of a dual-camera device, first depth-of-field information for a foreground region and second depth-of-field information for a background region in a current preview image.

In an embodiment of the present disclosure, the dual-camera device has two rear cameras. A manner for arranging the two rear cameras may include, but be not limited to, the followings.

In an embodiment, the two rear cameras are arranged along a horizontal direction.

In an embodiment, the two rear cameras are arranged along a longitudinal direction.

The horizontal direction refers to a direction parallel to a short side of a mobile terminal, while the longitudinal direction is a direction parallel to a long side of the mobile terminal.

It is to be illustrated that, the two rear cameras may be arranged according to other manners. For example, the two rear cameras may be arranged such that a line connecting the two rear cameras and a horizontal direction form a predetermined angle.

In embodiments of the present disclosure, the preview image data may be data obtained by imaging a photographed object via a camera. The current preview image is generated based on at least one of preview image data obtained via the two rear cameras. The depth-of-field information refers to a distance from a closest point where a clear image of a photographed object is generated to a farthest point where a clear image a photographed object is generated, i.e., a special depth within which a clear image of the photographed object is generated. The depth-of-field information corresponding to each image point of the preview image may be searched based on a phase difference contained in the preview image data obtained via the two rear cameras according to a respective image point.

Since positions where the two rear cameras are located are different, there may be a certain angular difference and a certain distance different for the two rear cameras, in view of the photographed object. Therefore, there is a certain phase difference in corresponding preview image data. For example, regarding to a point A on the photographed object, a pixel coordinate of the point A is (30, 50) in the preview image data of the camera 1, while the pixel coordinate of the point A is (30, 48) in the preview image data of camera 2. Therefore, the phase difference of the pixel point corresponding to the point A is 50−48=2 in the preview image data of the camera 1 and of the camera 2.

In embodiments of the present disclosure, a relationship between the depth-of-field information and the phase differences may be established in advance according to experimental data and camera parameters. Therefore, the determining module 10 may be configured to search corresponding depth-of-field information based on the phase difference in the preview image data obtained via the two cameras for each image point of the preview image. For example, when the phase different is 2 for the above point A, if the depth-of-field is 5 meters as searched according to a predetermined correspondence relationship, the depth-of-field information corresponding to the point A in the current preview image is 5 meters. In this way, the depth-of-field information of each image point in the current preview image may be obtained.

After the depth-of-field information of each image point in the current preview image is obtained, the determining module 10 may be configured to determine the first depth-of-field information for the foreground region in the current preview image. The depth-of-field information for a region excluding the foreground region having the first depth-of-field information is determined as the second depth-of-field information for the background region.

In embodiments, the determining module 10 may be configured to determine the first depth-of-field information via various manners. For example, determination of the first depth-of-field information for the foreground region in the current preview image may be exemplary illustrated via the followings.

In an embodiment, the foreground region in the current preview image is determined, and the first depth-of-field information for the foreground region is consisted of depth-of-field information of pixel points located in the foreground region.

The first depth-of-field information for the foreground region is consisted of the depth-of-field information of each pixel point located in the foreground region.

The foreground region may be selected by a user, or may be determined according to an in-focused region selected by the user or selected by default. For example, the foreground region may be obtained by extending the in-focused region by a predetermined region.

In an embodiment, the first depth-of-field information for the foreground region is determined according to the depth-of-field information of the in-focused region in the current preview image. In detail, the determining module 10 may be configured to determine third depth-of-field information for an in-focused region in the current preview image according to the preview image data acquired via the two cameras of the dual-camera device. In addition, the determining module 10 may be further configured to determine the first depth-of-field for the foreground region in the current preview image according to a third average value of the third depth-of-field information for the in-focused region and a predetermined adjustment value, and determine depth-of-field information of a region excluding the foreground region of the first depth-of-field information as the second depth-of-field information for the background region.

The third depth-of-field information for the in-focused region is consisted of the depth-of-field information of each pixel point located in the in-focused region. Therefore, the depth-of-field information of each pixel point may be searched according to the phase difference of each pixel point in the preview image data acquired by the two rear cameras in the dual-camera device. Thus, the third depth-of-field information for the in-focused region in the current preview image is determined by determining the depth-of-field information of each pixel point located in the in-focused region in the current preview image.

In embodiments of the present disclosure, the in-focused region may be selected by the user or may be automatically adjusted by the camera.

In an embodiment of the present disclosure, the third average value may be adjusted according to the predetermined adjustment value, to obtain the first depth-of-field information for the foreground region in the current preview image. A manner for adjusting the third average value may include, but be not limited to, followings.

In an embodiment, the predetermined adjustment value may be added to the third average value to obtain an upper limit of a depth-of-field range. The predetermined adjustment value may be subtracted from the third average value to obtain a lower limit of a depth-of-field range. The depth-of-field information between the upper limit of the depth-of-field range and the lower limit of the depth-of-field range is the first depth-of-field information for the foreground region in the current preview image.

In an embodiment, the third average value is multiplied with the predetermined adjustment value to obtain the upper limit of the depth-of-field range. The third average value is divided by the predetermined adjustment value to obtain the lower limit of the depth-of-field range. The depth-of-field information between the upper limit of the depth-of-field range and the lower limit of the depth-of-field range is the first depth-of-field information for the foreground region in the current preview image.

An acquiring module 20 is configured to acquire a basic value of a blurring degree according to the first depth-of-field information and the second depth-of-field information.

The basic value of the blurry degree is a basic value of the blurring degree. A blurring coefficient may be obtained by performing a calculation on the basis of the basic value of the blurring degree. The background region may be blurred according to the blurring coefficient.

In an embodiment of the present disclosure, the acquiring module 20 may be configured to acquire the basic value of the blurring degree in many ways according to the first depth-of-field information and the second depth-of-field information. For example, the acquiring module 20 may be configured to obtain a representative value of the first depth-of-field information and a representative value of the second depth-of-field information respectively. In addition, the acquiring module 20 may be configured to determine the basic value of the blurring degree by performing a calculation on the representative value of the first depth-of-field information and the representative value of the second depth-of-field information. The representative value may include, but be not limited to, an average value, a sampled value or the like. The calculation employed to obtain the basic value of the blurring degree may include, but be not limited to, a ratio, a difference, or multiplying or adding a predetermined value on the ratio or the difference.

In an embodiment of the present disclosure, the acquiring module 20 may be configured to acquire a first average value for the first depth-of-field information and a second average value for the second depth-of-field information. In addition, the acquiring module 20 is configured to calculate a ratio of the first average value and the second average value to acquire the basic value of the blurring degree.

A generating module 30 is configured to perform Gaussian blur process on the background region according to the basic value of the blurring degree to generate the blurred image.

In embodiments of the present disclosure, the generating module 30 is configured to perform the Gaussian blur process on the background region according to the basic value of the blurring degree and the depth-of-field information for the background region (i.e., the second depth-of-field information), such that the higher the depth-of-field information for the background region, the higher the blurring degree of the background region. In detail, a unified blurring coefficient may be determined for all pixel points in the background region according to the basic value of the blurry region and the second depth-of-field information. Alternatively, a corresponding blurring coefficient is determined for each pixel point in the background region and the Gaussian blur process is performed on each pixel point in the background region based on the blurring coefficient.

Figure 5:
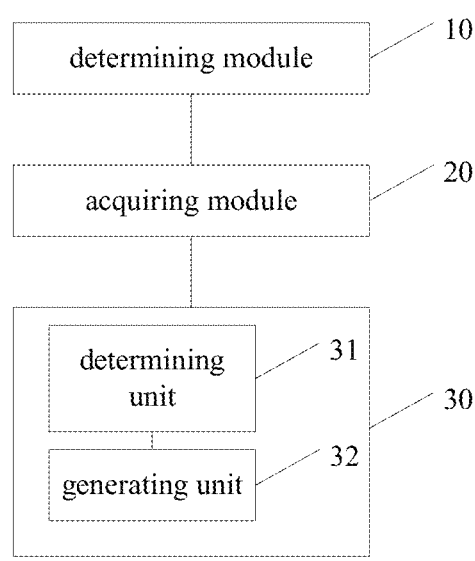
FIG. 5 is a schematic diagram illustrating a device for generating a blurred image according to another embodiment of the present disclosure.

In an embodiment of the present disclosure, as illustrated in FIG. 5, the generating module 30 may include a determining unit 31 and a generating unit 32.

The determining unit 31 is configured to determine a blurring coefficient for each pixel in the background region according to the basic value of the blurring degree and the second depth-of-field information for the background region.

The blurring coefficient represents a degree of blurring the background region. The higher the blurring coefficient, the higher the degree of blurring the background region.

In an embodiment of the present disclosure, the determining unit 31 may be configured to calculate a multiplied value by multiplying the basic value of the blurring degree by the second depth-of-field information of each pixel in the background region, to obtain the blurring coefficient for each pixel in the background region.

The generating unit 32 is configured to perform the Gaussian blur process on the background region according to the blurring coefficient for each pixel in the background region to generate the blurred image.

With the device for generating a blurred image according to embodiments of the present disclosure, the depth-of-field information for the foreground region and for the background region in the current preview image are acquired according to the preview image data obtained via the two rear cameras in the dual-camera device, the basic value of the blurring degree is acquired according to the depth-of-field information for the foreground region and for the background region, and the background region is processed with the Gaussian blur process according to the basic value of the blurring degree to generate the blurred image. The process of generating the background blurred image is simplified when photographing, without selections of the foreground region and the blurring coefficient at each time when photographing. That is, the background blurred image may be generated, the photographing efficiency may be increased and the photographing experience may be improved.

Embodiments of the present disclosure further provide a mobile terminal.

The mobile terminal according to embodiments of the present disclosure includes a device for generating a blurred image according to any one of embodiments of the present disclosure.

With the mobile terminal according to embodiments of the present disclosure, the depth-of-field information for the foreground region and for the background region in the current preview image are acquired according to the preview image data obtained via the two rear cameras in the dual-camera device, the basic value of the blurring degree is acquired according to the depth-of-field information for the foreground region and for the background region, and the background region is processed with the Gaussian blur process according to the basic value of the blurring degree to generate the blurred image. The process of generating the background blurred image is simplified when photographing, without selections of the foreground region and the blurring coefficient at each time when photographing. That is, the background blurred image may be generated, the photographing efficiency may be increased and the photographing experience may be improved.

Embodiments of the present disclosure further provide another mobile terminal.

The mobile terminal according to embodiments of the present disclosure includes a housing, a processor, a memory, a circuit board and a power supply circuit. The circuit board is enclosed by the housing. The processor and the memory are positioned on the circuit board. The power supply circuit is configured to provide power for respective circuits or components of the electronic device. The memory is configured to store executable program codes. The processor is configured to run a program corresponding to the executable program codes by reading the executable program codes stored in the memory, to perform following operations.

According to preview image data acquired via two rear cameras of a dual-camera device, first depth-of-field information for a foreground region and second depth-of-field information for a background region in a current preview image are determined.

A basic value of a blurring degree is acquired according to the first depth-of-field information and the second depth-of-field information.

Gaussian blur process is performed on the background region according to the basic value of the blurring degree to generate the blurred image.

With the mobile terminal according to embodiments of the present disclosure, the depth-of-field information for the foreground region and for the background region in the current preview image are acquired according to the preview image data obtained via the two rear cameras in the dual-camera device, the basic value of the blurring degree is acquired according to the depth-of-field information for the foreground region and for the background region, and the background region is processed with the Gaussian blur process according to the basic value of the blurring degree to generate the blurred image. The process of generating the background blurred image is simplified when photographing, without selections of the foreground region and the blurring coefficient at each time when photographing. That is, the background blurred image may be generated, the photographing efficiency may be increased and the photographing experience may be improved.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise (a non-exhaustive list): an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

In the description of the specification, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or features may be combined in any suitable manner in one or more embodiments or examples. Moreover, those skilled in the art could combine different embodiments or different features in embodiments or examples described in the present disclosure.

Although embodiments of present disclosure have been shown and described above, it should be understood that for those skilled in the art, changes, variations, alternatives, and modifications can be made to the embodiments within the scope of the present disclosure. and the scope of the present disclosure is limited by following claims and their equivalents.

What is claimed is:

1. A method for generating a blurred image, comprising:
   determining, according to preview image data acquired via two rear cameras of a dual-camera device, first depth-of-field information for a foreground region and second depth-of-field information for a background region in a current preview image;
   acquiring a first average value for the first depth-of-field information and a second average value for the second depth-of-field information, and calculating a ratio of the first average value and the second average value to acquire the basic value of the blurring degree; and
   performing Gaussian blur process on the background region according to the basic value of the blurring degree to generate the blurred image.

2. The method according to claim 1, wherein, determining, according to the preview image data acquired via the two rear cameras of the dual-camera device, the first depth-of-field information for the foreground region and the second depth-of-field information for the background region in the current preview image comprises:
   determining third depth-of-field information for an in-focused region in the current preview image according to the preview image data acquired via the two cameras of the dual-camera device; and
   determining the first depth-of-field for the foreground region in the current preview image according to a third average value of the third depth-of-field information for the in-focused region and a predetermined adjustment value, and determining depth-of-field information of a region excluding the foreground region having the first depth-of-field information as the second depth-of-field information for the background region.

3. The method according to claim 1, wherein, performing the Gaussian blur process on the background region according to the basic value of the blurring degree to generate the blurred image comprises:
   determining a blurring coefficient for each pixel in the background region according to the basic value of the blurring degree and the second depth-of-field information for the background region; and
   performing the Gaussian blur process on the background region according to the blurring coefficient for each pixel in the background region to generate the blurred image.

4. The device according to claim 3, wherein determining the blurring coefficient for each pixel in the background region according to the basic value of the blurring degree and the second depth-of-field information for the background region comprises:
   calculating a multiplied value by multiplying the basic value of the blurring degree by the second depth-of-field information of each pixel in the background region, to obtain the blurring coefficient for each pixel in the background region.

5. The method according to claim 1, further comprising:
   determining an in-focused region by a predetermined selection;
   extending the in-focused region by a predetermined region to determine the foreground region.

6. The method according to claim 2, wherein determining the first depth-of-field for the foreground region in the current preview image according to a third average value of the third depth-of-field information for the in-focused region and a predetermined adjustment value comprises:
   adding the predetermined adjustment value to the third average value to obtain an upper limit of a depth-of-field range;
   subtracting the predetermined adjustment value from the third average value to obtain a lower limit of a depth-of-field range; and
   determining depth-of-field information between the upper limit of the depth-of-field range and the lower limit of the depth-of-field range as the first depth-of-field information for the foreground region in the current preview image.

7. The method according to claim 2, wherein determining the first depth-of-field for the foreground region in the current preview image according to a third average value of the third depth-of-field information for the in-focused region and a predetermined adjustment value comprises:
- multiplying the third average value with the predetermined adjustment value to obtain the upper limit of the depth-of-field range;
- dividing the third average value by the predetermined adjustment value to obtain the lower limit of the depth-of-field range; and
- determining depth-of-field information between the upper limit of the depth-of-field range and the lower limit of the depth-of-field range as the first depth-of-field information for the foreground region in the current preview image.

8. A terminal device, comprising a housing, a processor, a memory, a circuit board and a power supply circuit, wherein, the circuit board is enclosed by the housing; the processor and the memory are positioned on the circuit board; the power supply circuit is configured to provide power for respective circuits or components of the electronic device; the memory is configured to store executable program codes; and the processor is configured to run a program corresponding to the executable program codes by reading the executable program codes stored in the memory, to perform following operations:
- determining, according to preview image data acquired via two rear cameras of a dual-camera device, first depth-of-field information for a foreground region and second depth-of-field information for a background region in a current preview image;
- acquiring a first average value for the first depth-of-field information and a second average value for the second depth-of-field information, and calculating a ratio of the first average value and the second average value to acquire the basic value of the blurring degree; and
- performing Gaussian blur process on the background region according to the basic value of the blurring degree to generate the blurred image.

9. The terminal device according to claim 8, wherein determining, according to the preview image data acquired via the two rear cameras of the dual-camera device, the first depth-of-field information for the foreground region and the second depth-of-field information for the background region in the current preview image comprises:
- determining third depth-of-field information for an in-focused region in the current preview image according to the preview image data acquired via the two cameras of the dual-camera device; and
- determining the first depth-of-field for the foreground region in the current preview image according to a third average value of the third depth-of-field information for the in-focused region and a predetermined adjustment value, and determining depth-of-field information of a region excluding the foreground region having the first depth-of-field information as the second depth-of-field information for the background region.

10. The terminal device according to claim 8, wherein performing the Gaussian blur process on the background region according to the basic value of the blurring degree to generate the blurred image comprises:
- determining a blurring coefficient for each pixel in the background region according to the basic value of the blurring degree and the second depth-of-field information for the background region; and
- performing the Gaussian blur process on the background region according to the blurring coefficient for each pixel in the background region to generate the blurred image.

11. The terminal device according to claim 10, wherein determining the blurring coefficient for each pixel in the background region according to the basic value of the blurring degree and the second depth-of-field information for the background region comprises:
- calculating a multiplied value by multiplying the basic value of the blurring degree by the second depth-of-field information of each pixel in the background region, to obtain the blurring coefficient for each pixel in the background region.

12. The terminal device according to claim 8, wherein the processor is configured to run a program corresponding to the executable program codes by reading the executable program codes stored in the memory, to perform following operations:
- determining an in-focused region by a predetermined selection;
- extending the in-focused region by a predetermined region to determine the foreground region.

13. The terminal device according to 9, wherein the processor is configured to run a program corresponding to the executable program codes by reading the executable program codes stored in the memory, to perform following operations:
- adding the predetermined adjustment value to the third average value to obtain an upper limit of a depth-of-field range;
- subtracting the predetermined adjustment value from the third average value to obtain a lower limit of a depth-of-field range; and
- determining depth-of-field information between the upper limit of the depth-of-field range and the lower limit of the depth-of-field range as the first depth-of-field information for the foreground region in the current preview image.

14. The terminal device according to claim 9, wherein the processor is configured to run a program corresponding to the executable program codes by reading the executable program codes stored in the memory, to perform following operations:
- multiplying the third average value with the predetermined adjustment value to obtain the upper limit of the depth-of-field range;
- dividing the third average value by the predetermined adjustment value to obtain the lower limit of the depth-of-field range; and
- determining depth-of-field information between the upper limit of the depth-of-field range and the lower limit of the depth-of-field range as the first depth-of-field information for the foreground region in the current preview image.

15. A non-transitory computer readable storage medium, having computer programs stored thereon, wherein when the computer programs are executed by a processor, a method for generating a blurred image is realized, and the method comprises:
- determining, according to preview image data acquired via two rear cameras of a dual-camera device, first depth-of-field information for a foreground region and second depth-of-field information for a background region in a current preview image;
- acquiring a first average value for the first depth-of-field information and a second average value for the second depth-of-field information, and calculating a ratio of the first average value and the second average value to acquire the basic value of the blurring degree; and performing Gaussian blur process on the background region according to the basic value of the blurring degree to generate the blurred image.

16. The non-transitory computer readable storage medium according to claim 15, wherein determining, according to the preview image data acquired via the two rear cameras of the dual-camera device, the first depth-of-field information for the foreground region and the second depth-of-field information for the background region in the current preview image comprises:
    determining third depth-of-field information for an in-focused region in the current preview image according to the preview image data acquired via the two cameras of the dual-camera device; and
    determining the first depth-of-field for the foreground region in the current preview image according to a third average value of the third depth-of-field information for the in-focused region and a predetermined adjustment value, and determining depth-of-field information of a region excluding the foreground region having the first depth-of-field information as the second depth-of-field information for the background region.

17. The non-transitory computer readable storage medium according to claim 15, wherein, performing the Gaussian blur process on the background region according to the basic value of the blurring degree to generate the blurred image comprises:
    determining a blurring coefficient for each pixel in the background region according to the basic value of the blurring degree and the second depth-of-field information for the background region; and
    performing the Gaussian blur process on the background region according to the blurring coefficient for each pixel in the background region to generate the blurred image.

* * * * *